(12) United States Patent
Arafat et al.

(10) Patent No.: US 11,786,868 B2
(45) Date of Patent: *Oct. 17, 2023

(54) THREE-DIMENSIONAL FEED SPACERS WITH TPMS ARCHITECTURES FOR MEMBRANE-BASED SYSTEMS

(71) Applicant: Khalifa University of Science and Technology, Abu Dhabi (AE)

(72) Inventors: Hassan Arafat, Abu Dhabi (AE); Rashid Abu Al-Rub, Abu Dhabi (AE); Nurshaun Sreedhar, Abu Dhabi (AE); Oraib Al-Ketan, Abu Dhabi (AE); Navya Thomas, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 148 days.

This patent is subject to a terminal disclaimer.

(21) Appl. No.: 17/368,583

(22) Filed: Jul. 6, 2021

(65) Prior Publication Data
US 2021/0331118 A1    Oct. 28, 2021

Related U.S. Application Data

(62) Division of application No. 15/795,864, filed on Oct. 27, 2017, now abandoned.

(60) Provisional application No. 62/413,435, filed on Oct. 27, 2016.

(51) Int. Cl.
| B01D 63/12 | (2006.01) |
| B01D 63/06 | (2006.01) |
| B01D 63/08 | (2006.01) |
| B01D 63/10 | (2006.01) |

(52) U.S. Cl.
CPC ............. *B01D 63/12* (2013.01); *B01D 63/06* (2013.01); *B01D 63/062* (2013.01); *B01D 63/065* (2013.01); *B01D 63/08* (2013.01); *B01D 63/10* (2013.01); *B01D 63/103* (2013.01); *B01D 2313/143* (2013.01); *B01D 2313/146* (2013.01)

(58) Field of Classification Search
CPC ............................. B01D 63/12; B01D 63/103; B01D 2313/143; B01D 2313/146; B01D 63/06; B01D 63/062; B01D 63/065; B01D 63/08; B01D 63/10
See application file for complete search history.

(56) References Cited

U.S. PATENT DOCUMENTS

| 5,238,613 | A | 8/1993 | Anderson |
| 2014/0014493 | A1 | 1/2014 | Ryan |

OTHER PUBLICATIONS

U.S. Appl. No. 15/795,864, Final Office Action, dated Apr. 5, 2021, 5 pages.
U.S. Appl. No. 15/795,864, Final Office Action, dated Jun. 9, 2020, 6 pages.

(Continued)

*Primary Examiner* — John Kim
(74) *Attorney, Agent, or Firm* — Kilpatrick Townsend & Stockton LLP

(57) ABSTRACT

A filter element comprises a membrane layer; and a feed spacer on the membrane layer, wherein the feed spacer comprises a plurality of unit cells arranged in three dimensions, wherein each of the plurality of unit cells comprises a cavity defined by a triply periodic minimal surface, and wherein the cavities of the plurality of unit cells are interconnected to allow a fluid to pass through the cavities of the plurality of unit cells.

20 Claims, 23 Drawing Sheets

(56) References Cited

OTHER PUBLICATIONS

U.S. Appl. No. 15/795,864, Non-Final Office Action, dated Dec. 20, 2019, 6 pages.
U.S. Appl. No. 15/795,864, Non-Final Office Action, dated Oct. 15, 2020, 7 pages.
Femmer, "Rapid Prototyping of Membranes and Membrane Devices", From the Faculty of Mechanical Engineering, Sep. 11, 2015, 108 pages.
U.S. Appl. No. 17/202,062, Non-Final Office Action, dated Feb. 1, 2023, 8 pages.

THREE-DIMENSIONAL FEED SPACERS WITH TPMS ARCHITECTURES FOR MEMBRANE-BASED SYSTEMS

CROSS REFERENCE TO RELATED APPLICATIONS

This application is a divisional of U.S. application Ser. No. 15/795,864 filed on Oct. 27, 2017, now abandoned, which claims the benefit of and priority to U.S. Provisional Application No. 62/413,435 filed on Oct. 27, 2016, and titled "Three-Dimensional Feed Spacers With TPMS Architectures For Membrane-Based Systems," the contents of both of which are herein incorporated by reference in their entireties for all purposes.

FIELD OF THE INVENTION

The present invention relates to three-dimensional feed spacers, and in particular, three-dimensional feed spacers with Triply Periodic Minimal Surface (TPMS) structures, along with methods of making and using the same and membrane-based systems incorporating three-dimensional feed spacers with TPMS structures.

BACKGROUND

Membranes are used to separate a mixture of components by being selectively permeable to one or more of the components and impermeable to the others. This separation can be achieved by the differences in a number of physical or chemical properties of the components in the mixture, such as size, vapor pressure, and electric charge. Membranes are made of a number of materials including but not limited to ceramics, polymers and metals. For the separation to take place, the mixture is passed over the surface of the membrane, where depending on the separation characteristics, certain components are allowed to pass through the membrane, which is called the permeate or permeate stream. The rest of the mixture is collected as the reject stream. The reject stream may be discarded or further used as a feed stream to increase the yield of permeate.

The different types of membrane separation processes such as microfiltration, ultrafiltration, nanofiltration, reverse osmosis and membrane distillation are susceptible to fouling and concentration polarization. During concentration polarization, there is a buildup of solute particles at the surface of the membrane that decreases the flux through the membrane and increases the pressure required in the process. Fouling can be broadly classified into two types; organic and inorganic. Inorganic fouling refers to the deposition of silt and salts on the membrane surface, as well as the precipitation of salts in the feed stream that leads to scaling on the membrane. This leads to clogging of the pores. On the other hand, the growth of microbes on the surface of the membrane in the form of biofilms is known as biofouling. Both types of fouling have adverse effects on the membrane life as well as the energy requirements of the system operations.

Feed channel spacers perform a dual role in membrane systems. First, feed spacers increase the turbulence of the flow to provide better mixing along the surface of the membrane, which reduces the concentration polarization effect and enhances the mass transfer. Effective mixing of fluid increases the local shear rates and velocities of the fluid, which reduces the boundary layer thickness and hence lessens the concentration polarization effect by enhancing the mass transfer. Secondly, feed spacers provide mechanical support to the membrane.

Commercial net-type spacers commonly come in two forms, mesh type (ladder type) and diamond type spacers. Spacers are either woven or non-woven and are available in a variety of materials, with variations in strand length, intersection angle, and thickness. However, the standard feed spacers are still susceptible to plugging and fouling, such as at the nodes where particle deposition begins. These are areas of the spacer which obstruct the flow of the liquid and have stagnant regions for fouling to take place. Such dead zones are the prime locations for the origination of biofouling since they provide an ideal location for the growth of microbes. They also result in scaling because initial nucleation of inorganic fouling begins at these dead zones.

SUMMARY OF EMBODIMENTS OF THE INVENTION

In some embodiments, a filter element comprises a membrane layer; and a feed spacer on the membrane layer, wherein the feed spacer comprises a plurality of unit cells arranged in three dimensions, wherein each of the plurality of unit cells comprises a cavity defined by a triply periodic minimal surface, and wherein the cavities of the plurality of unit cells are interconnected to allow a fluid to pass through the cavities of the plurality of unit cells.

In some embodiments, the filter element further comprises a permeate-side spacer defining a permeate channel on the membrane layer opposite the feed spacer.

In some embodiments, the feed spacer defines at least a portion of a feed stream channel configured to receive a feed fluid with a solute, and the membrane layer is configured to filter the feed fluid to form a permeate having a reduced concentration of the solute in the permeate channel. The feed stream channel is configured to output a reject stream having a higher concentration of the solute than the feed fluid.

In some embodiments, the feed spacer comprises a generally planar body having opposing surfaces. The opposing surfaces of the generally planar body define triply periodic minimal surfaces that define cavities of the plurality of unit cells. The generally planar body may be formed as a single, unitary member. In some embodiments, the triply periodic minimal surface is a Schwarz Primitive surface, a Schwarz crossed layers of parallels (CLP), a Schoen's Gyroid surface, a Schoen's I-WP surface, a Schwarz diamond surface, a Fischer-Koch PMY surface, an FRD surface, a Fischer-Koch CY surface, a Fischer-Koch S surface, or a Neovius surface. In some embodiments, the feed spacer comprises a polymeric material, a ceramics material, a metal material or composites thereof.

In some embodiments, a filtration device comprises: a housing; a filter element in the housing, the filter element comprising: a membrane layer; and a feed stream channel including a feed spacer on the membrane layer, the feed stream channel being configured to receive a feed fluid therein, the feed fluid comprising a solute; and a permeate-side spacer on the membrane layer opposite the feed spacer and configured to receive a permeate fluid via the membrane, the permeate fluid having a concentration of the solute that is less than a concentration of the solute in the feed fluid; wherein the feed spacer comprises a plurality of unit cells arranged in three dimensions wherein each of the plurality of unit cells of the feed spacer comprises a cavity defined by a triply periodic minimal surface, and wherein the cavities of the plurality of unit cells are interconnected to allow the feed fluid to pass through the cavities of the plurality of unit cells; a feed channel inlet configured to provide a feed fluid input to the feed channel; and a permeate outlet configured to provide a permeate output from the permeate-side spacer.

In some embodiments, the filter element comprises a plurality of filter elements spirally wound around a hollow tubular member, the hollow tubular member having at least one open end and apertures along a length thereof configured to receive the permeate fluid from the permeate-side spacer, and wherein the permeate outlet comprises the at least one open end of the tubular member.

In some embodiments, the feed stream channel is configured to output a reject, stream having a higher concentration of solute than the feed fluid.

In some embodiments, the housing is configured to contain fluid in the filter element under a pressure greater than atmospheric pressure.

In some embodiments, the feed spacer comprises a generally planar body having opposing surfaces. The opposing surfaces of the generally planar body define triply periodic minimal surfaces that define cavities of the plurality of unit cells. The generally planar body may be formed as a single, unitary member.

In some embodiments, the triply periodic minimal surface is a Schwarz Primitive surface, a Schwarz crossed layers of parallels (CLP), a Schoen's Gyroid surface, a Schoen's I-WP surface, a Schwarz diamond surface, a Fischer-Koch PMY surface, a FRD surface, a Fischer-Koch CY surface, a Fischer-Koch S surface, or a Neovius surface.

In some embodiments, the feed spacer comprises a polymeric material, a ceramics material, a metal material or composites thereof.

In some embodiments, a feed spacer structure for a membrane-based filtration system comprises: a plurality of unit cells arranged in three dimensions, wherein each of the plurality of unit cells comprises a cavity defined by a triply periodic minimal surface, and wherein the cavities of the plurality of unit cells are interconnected to allow a fluid to pass through the cavities of the plurality of unit cells.

In some embodiments, the feed spacer comprises a generally planar body having opposing surfaces.

In some embodiments, the opposing surfaces of the generally planar body define triply periodic minimal surfaces that define cavities of the plurality of unit cells.

In some embodiments, the generally planar body may be formed as a single, unitary member.

In some embodiments, the triply periodic minimal surface is a Schwarz Primitive surface, a Schwarz crossed layers of parallels (CLP), a Schoen's Gyroid surface, a Schoen's I-WP surface, a Schwarz diamond surface, a Fischer-Koch PMY surface, a FRD surface, a Fischer-Koch CY surface, a Fischer-Koch S surface, or a Neovius surface.

In some embodiments, the feed spacer comprises a polymeric material, a ceramics material, a metal material or composites thereof.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF EMBODIMENTS OF THE INVENTION

Figure 1A:
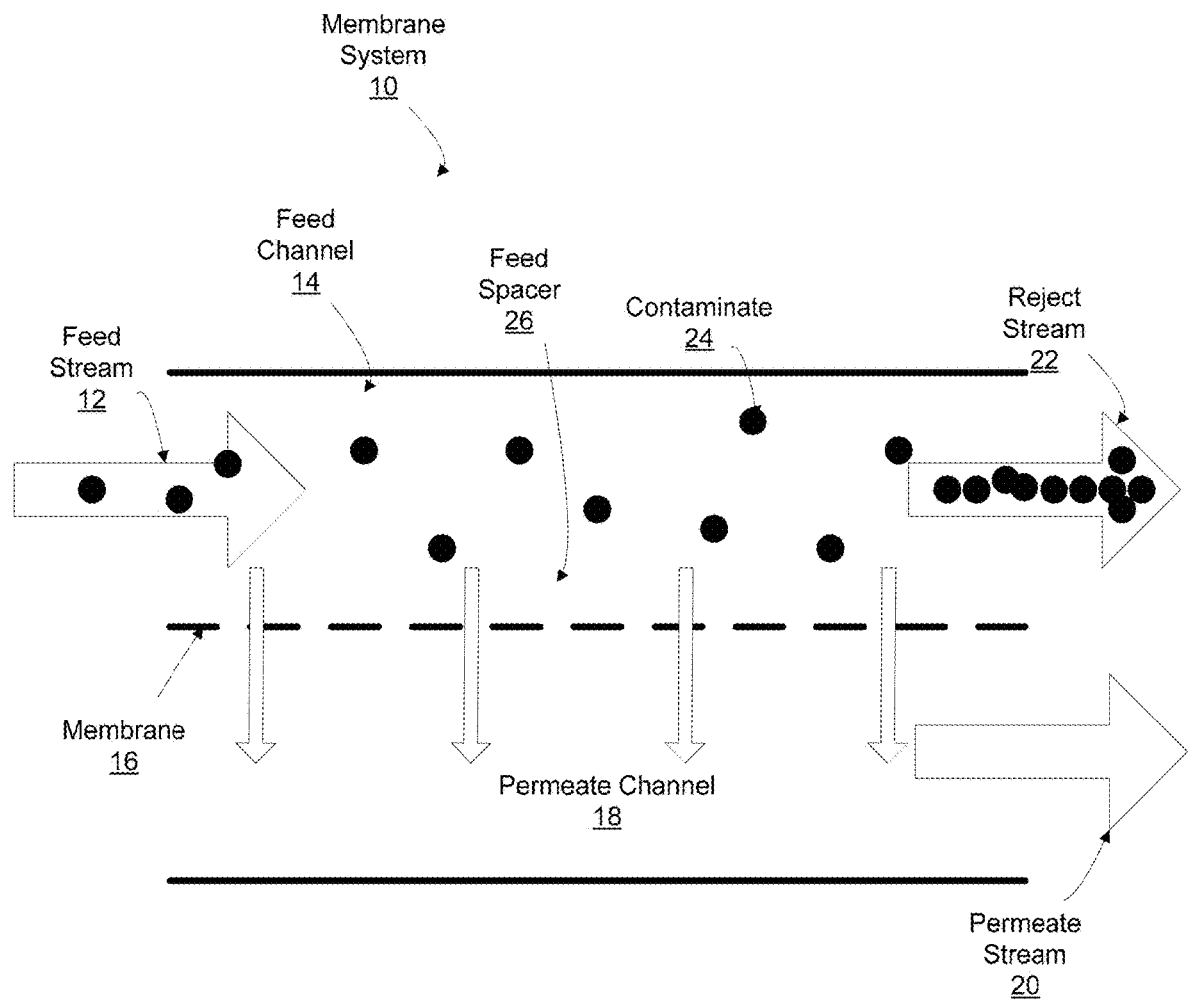
FIG. 1A is a schematic diagram of a membrane-based system according to some embodiments.

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise.

As used herein, a "membrane-based system" or "membrane system" means a device that separates a mixture of components with the aid of a selectively permeable layer or membrane that allows the passage of only particular components based on their physical or chemical properties. A membrane system typically includes a feed stream (or feed fluid or feed fluid input), a feed spacer, a membrane, a permeate stream and a reject stream.

"Membrane" means a selective barrier that allows the passage of certain components in a mixture while preventing the passage of other components. Membranes can be either biological, such as cell membranes, or synthetic. Synthetic membranes are used in a wide variety of industries for separation processes. Membranes can be made from numerous materials including polymers, ceramics and metals. Membranes can separate the components based on different chemical and/or physical properties such as size, change and chemical potential.

"Feed spacer" means a material placed in the feed channel and/or permeate channel of a membrane-based system. Feed spacers may be configured to increase turbulence of the feed stream at the surface of the membrane and/or to provide mechanical support to the membrane.

"Feed stream" means the influent of a membrane-based system, which is a mixture of the components that are required to be separated by the membrane.

"Permeate stream" means the component or group of components that passes through the membrane.

"Reject stream" means the component or group of components retained by the membrane.

"Concentration polarization" means the phenomenon observed in membrane-based systems where there is an increased concentration of the components rejected by the membrane near the surface of the membrane. This phenomenon leads to a reduction in the driving force through the membrane, hence reducing the flux or passage of permeate through the membrane.

"Fouling" means the deposition, accumulation and growth of unwanted particles on the surface of the feed spacer or the membrane. Fouling can be either inorganic of biological in nature, and in either case leads to the clogging of pores and decrease of flux. Fouling may increase the cost of operation, the requirement of chemicals for cleaning, and decrease in life of the membrane.

"Minimal surface" means a surface that locally minimizes its area such that the mean curvature at each point on the surface is zero.

"Mean curvature" used herein means the average of the two principal curvatures.

"Principal curvatures" means the maximum and minimum of the normal curvatures at a specific point.

"Triply periodic minimal surface" (TPMS) means the minimal surfaces having a unit cell that can be repeated in three directions and has no self-intersections such that it divides the spaces into two interpenetrating meandering spaces.

"3D printing" means a form of additive manufacturing technology where a part is created in three dimensions by successive layers of material.

"Additive manufacturing" means a process of joining materials layer upon layer to make a part in the three dimensional space.

"Selective laser sintering" means a process whereby the 3D printing is achieved by applying a laser to a layer of fine powders to melt the powder and to solidify the molten powder with the shape of the desired layer, after which another layer of fine powder covers the previous layer and the same process is repeated again to arrive to the final desired structure.

"Computer aided design" (CAD) means the use of computer software to help designers create and achieve their required design.

"Computer aided manufacturing" (CAM) means the control of a manufacturing process via computer software where typically parts are designed using computer aided design (CAD) technologies. The control takes the form of controlling manufacturing tools, manufacturing time, and ultimately manufacturing accuracy.

Spacers having improved hydrodynamics according to some embodiments may reduce fouling, and in particular, biofouling, faced by membrane technologies. Because it is virtually impossible to prevent the presence of microbes in the feed stream, such as when the feed stream is water, another avenue for reducing fouling is an improvement in the hydrodynamics of the flow through the spacers to minimize the dead zones for deposition of microbes and nutrients on the spacer and membrane surfaces.

In some embodiments, a design based on triply periodic minimal surfaces (TPMS) may be used. The fabrication of these complicated, curved, continuous and smooth shapes may be possible with the rapidly growing automated additive manufacturing techniques (3-D printing) that enable manufacturing complex geometries in relatively fast and efficient way. This technique may employ the use of computer technology to design the desired shapes and later manufacture the design using computer controlled manufacturing.

A TPMS architecture typically has a smooth, curved, continuous, interconnected geometry. Such a surface may minimize the area of the fluid-solid interaction where velocities are zero due to the adherence condition. A TPMS based architecture provides a minimal area where particle deposition is possible. In addition, the interconnected pores enhance the hydrodynamics of the spacers and increase turbulence, by providing multiple pathways for the fluid to travel through. The smooth surfaces reduce the pressure drop through the feed channel. Additionally, the enhanced mechanical properties of TPMS structures may enable these spacers to provide sufficient mechanical support to the membrane, even when spacers of low thickness and high porosity are used. Further described herein is a method of manufacturing the TPMS-based feed spacers via computer aided design and additive manufacturing.

FIG. 1A illustrates a membrane-based system 10 according to some embodiments. The membrane-based system 10 includes a feed stream 12 that passes through a feed channel 14, and a membrane 16. The system 10 further includes a permeate channel 18 that includes fluid that has passed from the feed channel 14 through the membrane 16 to form a permeate stream 20, and a reject stream 22 that exits the feed channel 14. The feed stream 12 includes solute particles or molecules 24. A feed spacer 26 is positioned in the feed channel 14.

In this configuration, the fluid in the system 10 is filtered (typically using a pressure-driven system or heat-driven system) via the membrane 16, and the solute particles or molecules 24 do not pass through the membrane 16 such that the solute particles or molecules 24 in the feed stream 12 remain in the feed channel 14 to form the reject stream 22, which includes a relatively high concentration of solute particles or molecules 24. Fluid that is generally free of the solute particles or molecules 24 (or has a significantly reduced level of solute particles or molecules 24) passes through the membrane 16 into the permeate channel 18 to form the permeate stream 20.

According to some embodiments, the feed spacer 26 includes plurality of unit cells arranged in three dimensions, and each of the plurality of unit cells comprises a cavity defined by a triply periodic minimal surface (TPMS). The cavities of the plurality of unit cells are interconnected to allow a fluid to pass through the cavities of the plurality of unit cells. Various TPMS unit cell patterns are described herein. The dimensions of the feed spacer thickness and the cavities in the feed spacer may be selected based on the desired properties of the spacer. In some embodiments, the feed spacer 26 may be 0.1 or 0.5 mm thick or less to 1, 2, 3, 4, 5, 7, or 10 mm thick or more. The diameter of the cavities may be 0.1 or 0.5 mm thick or less to 1, 2, 3, 4, 5, 7, or 10 mm thick or more.

The feed spacer 26 is positioned in the feed channel 14 such that the feed spacer 26 increases the turbulence of the flow to provide better mixing along the surface of the membrane 16, which reduces the concentration polarization effect and enhances the mass transfer. In particular embodiments, the feed spacer 26 may form a structure that defines the feed channel 14. In some embodiments, the fluid of the feed stream 12 is effectively mixed such that the local shear rates and velocities of the fluid reduce the boundary layer thickness, and consequently, the concentration polarization effect is reduced by enhancing the mass transfer. Moreover, the feed spacer 26 is configured to provide mechanical support to the membrane 16. Various feed spacer configurations are described herein. The feed spacer 26 extends generally throughout the feed channel 14 adjacent the membrane 16. The feed spacer 26 in the feed channel 14 may be formed of materials that include the TPMS material described herein and be positioned adjacent the membrane 16. In addition, in particular embodiments, the feed spacers described herein that are formed of TPMS material may be positioned in all or a portion of the permeate channel 18 to provide a permeate-channel spacer 28.

As discussed above, the feed spacer 26 includes plurality of unit cells arranged in three dimensions, and each of the plurality of unit cells comprises a cavity defined by a triply periodic minimal surface (TPMS). In some embodiments, the feed spacer 26 comprises a generally planar body having a thickness and opposing surfaces. At least one of the opposing surfaces of the generally planar body define a triply periodic minimal surface that define cavities of the plurality of unit cells; however, typically, both opposing surface of the feed spacer 26 will be formed of triply periodic minimal surfaces that define the cavities of the unit cells. The generally planar body may be formed as a single, unitary member (i.e., formed in a single unit, typically of a single material type, without seams or bonding intersections). For example, the feed spacer 26 may be formed using three-dimensional printing processes in a single piece of polymer material; however ceramics, polymers, metals, or composites thereof may be used. However, any suitable material may be used.

In some embodiments, the triply periodic minimal surface may be, but not limited to, a Schwarz Primitive surface, a Schwarz crossed layers of parallels (CLP), a Schoen's Gyroid surface, a Schoen's I-WP surface, a Schwarz diamond surface, a Fischer-Koch PMY surface, a FRD surface, a Fischer-Koch CY surface, a Fischer-Koch S surface, or a Neovius surface.

The membrane-based system 10 may be used in various filtration systems, including pressure-driven systems, such as reverse osmosis, microfiltration, ultrafiltration, and nanofiltration systems, including spiral wound and flat sheet/plate systems, or in heat-driven systems, such as thermal gradient systems, such as membrane distillation.

Figure 1B:
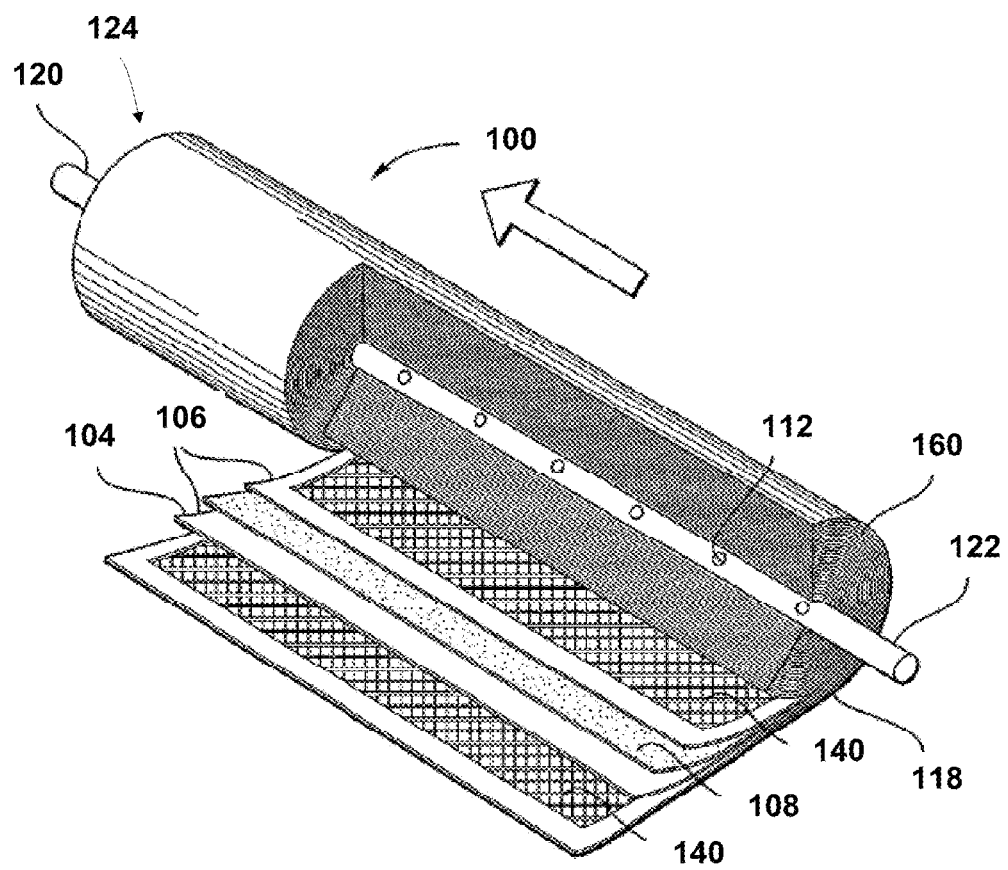
FIG. 1B is an example of a spiral wound membrane-based system according to some embodiments.

With reference to FIG. 1B, an example of a spiral wound filtration unit 100, such as a reverse osmosis (RO) element is shown. The spiral wound filtration unit 100 is typically placed in a pressure vessel so that the fluid is contained in the unit 100 under pressure. The unit 100 includes one or more membrane-based elements 104, which includes two membrane sheets 106 encapsulating a spacer, generally a permeate sheet 108. The permeate sheet 108 is in attached along one side to a collection tube 120 having holes 112 that are spaced apart along a length of the tube 120. A feed spacer 140 is provided between each membrane envelope 104 such that at least one membrane sheet 106 in each membrane envelope 104 is in contact with a feed spacer 140. The spiral wound unit 100 is formed when the membrane envelope(s) 104 and the feed spacer(s) 140 are rolled into a spiral around the collection tube 120. As discussed above, the feed spacers 140 create channels 160 between adjacent membrane sheets 106, allowing feed liquid to pass along the surface of the membrane sheets 106. The permeate sheets 108 are sealed at each end to prevent feed liquid from directly entering the permeate sheets 108.

When the spiral wound unit 100 is placed in a container under pressure, feed liquid is provided under pressure at a feed liquid inlet 118 and the liquid enters the channels 160 formed by the feed spacer 140. The feed liquid travels in a direction parallel to the collection tube 120. As the liquid travels across the surface of the membrane sheets 106, some of the liquid diffuses under pressure through the membrane sheets 106 and into the permeate sheet 108. The liquid in the permeate sheet 108 contains little or no solute or molecules compared to the feed liquid, and therefore, it travels in a spiral path through the permeate sheet 108 and through the holes 112 in the collection tube 120 and exits as a permeate stream. Feed liquid that does not diffuse through the membrane sheets 106 continues to travel in the axial direction until it reaches an outlet end 124 of the unit 100 as a "reject" stream. The reject stream may be further used as a feed stream to increase the yield of the permeate fluid.

Although the feed channel spacer configuration is described herein with respect to the feed spacer 140, it should be understood that the feed channel spacer may also be used as a permeate sheet 108.

In the some embodiments, the basic design of feed channel spacers is based on a three-dimensional spacer based on triply periodic minimal surfaces. Feed channel spacers according to some embodiments result in reduced concentration polarization and fouling effects, which in turn enhances the mass transfer through the membrane and the durability of the system. A method for manufacturing substrates based on triply periodic minimal surfaces by additive manufacturing is described herein.

In some embodiments, the first step of a method for producing a three-dimensional TPMS-based feed spacer for water treatment membranes uses a computer-aided design (CAD) software employed to create mathematically based digital files for the three-dimensional triply periodic minimal surface (TPMS) unit cell. The unit cells selected are interconnectable into a three-dimensional non-self-intersecting structure. In the second step of the method, the TPMS units are assigned a thickness or solidified and the unit cells are converted into one of two types of unit networks, sheet-network and solid network. In the third step, based on the intended use of feed spacer, a structure is selected and the unit cell network is patterned into a three-dimensional fitting within the structure. In the fourth step, the TPMS-network structure is converted, or sliced, into a two-dimensional pattern that when repeated forms a three-dimensional structure suitable for manufacturing by any means, preferably using a 3-D printer. In the fifth step, computer aided manufacturing is used to produce the material. The composition of the material is selected based on the use required for the membrane, such as for a water membrane. In the sixth step, the manufactured TPMS feed spacer is tested for flux properties of the water membrane. In particular embodiments, the second and third steps can be interchanged in order.

In some embodiments, the flux properties of the TPMS feed spacer is increased or optimized by modifying one or more elements of the first, second and third steps. In further embodiments, various TPMS feed spacers may be manufactured and tested for flux properties.

In some embodiments, the flux properties of the TPMS feed spacer demonstrate enhanced hydrodynamics and increase turbulence for fluid travel. The surface of the TPMS feed spacer may be minimized to reduce the area of fluid-solid interaction on the surface of the spacer to the feed stream, and thus, the TPMS spacer may reduce or prevent fouling. The TPMS feed spacer may be configured to minimize plugging and fouling from particle deposition.

In some embodiments, the mechanical properties of the TPMS feed spacer is sufficient to provide mechanical support to the membrane, and the TPMS feed spacer may have low thickness, high porosity, or a combination thereof.

In some embodiments, the composition of the TPMS feed spacer includes materials selected from ceramics, polymers, metals, or composites thereof; however any suitable material may be used. Some embodiments of TPMS feed spacer may have surface properties such as electric charge, oxidative properties or other desirable attributes. In some embodiments, the TPMS feed spacer composition is resistance to microbial growth or has biocidal properties. In some embodiments, the TPMS feed spacer material is a polymer, such as polypropylene, polyethylene, and like materials. In still other embodiments, the TPMS feed spacer material may be formed of stainless steel, alloys of aluminum, sintered metals, and like materials.

In some embodiments, the TPMS feed spacer is used in membranes for water treatment including microfiltration, ultrafiltration, nanofiltration, and reverse osmosis of a water feed stream. In some embodiments, the TPMS feed spacer is used in membranes for food processing including whey protein separation and juice concentration. In some embodiments, the TPMS feed spacer is used in membranes for metal removal including removal of high quality metals such as gold and uranium, and metal recovery in electroplating baths. In further embodiments, the TPMS feed is used in membranes for industrial applications such as petroleum refining from tar, biofuel separation from side products and recovery of water soluble paints.

In some embodiments, the TPMS feed spacer has enhanced mass and heat transfer that is optimized for fluid flow permeability, electrical, thermal and combinations thereof. In some embodiments, the enhanced mass and heat transfer TPMS feed spacer is used for applications that are pressure driven, heat driven and combinations thereof. In further embodiments, pressure driven applications such as reverse osmosis and heat driven applications such as membrane distillation may be provided using the TPMS feed spacers described herein.

In some embodiments, the TPMS feed spacer for water membranes is selected from Schwarz crossed layers of parallels (CLP), Schoen's I-WP Surface (IWP), Schwarz Primitive surface (P), Schoen's Gyroid Surface (G), Fischer-Koch S Surface (S-), Schwarz Diamond (D), Neovius surface (N), and Fischer-Koch CY Surface (CY). In particular embodiments, the TPMS feed spacer is selected from Schwarz crossed layers of parallels (CLP), Schoen's Gyroid G-solid-networks, Schwarz Primitive P-sheet-networks, and lastly, and Schwarz Primitive P-solid-networks. In particular embodiments, the TPMS feed spacer is Schwarz crossed layers of parallels (CLP). However, any suitable TPMS pattern may be used.

Minimal surfaces are topologies formed by enforcing local area minimization. These surfaces, or topologies, divide space into two continuous volumes. Each minimal surface possesses zero mean curvature or the sum of principal curvatures at any point on the surface is zero.

Triply periodic minimal surfaces (TPMS) structure is a structure based on the concept of minimal surfaces. This structure takes the form of a unit cell repeated in the three dimensions forming a periodic structure. These periodic structures have the advantage of being non-self-intersecting, where the structure is formed of continuous smooth curves with no edges or corners, splitting the space into maze-like spaces. Examples of periodic minimal surfaces that can be used as base structure for feed spacers include, but are not limited to: Schwarz crossed layers of parallels (CLP), Schoen's I-WP Surface (IWP), Schwarz Primitive surface (P), Schoen's Gyroid Surface (G), Fischer-Koch S Surface (S), Schwarz diamond (D), Neovius surface (N), and Fischer-Koch CY Surface (CY).

Example 1: Generation of TPMS Morphologies into Sheet and Solid Networks Feed Spacer Structures Referring now to the drawings, in FIG. 15 a schematic of the method of the advanced manufacturing of TPMS-based feed spacer for water membranes is illustrated, including an output of the steps.

In the first step (Block 200), a computer-aided design (CAD) software is employed to create mathematically based digital files for the desired three-dimensional triply periodic minimal surface (TPMS). These unit cells can be interconnected in a 3-dimensional non-self-intersecting structure, whereby a CAD drawing is used to generate a desired periodic minimal surface.

In the second step (Block 202), two strategies can be employed to create a TPMS-based feed spacer. First, the minimal surface is given a desired thickness such that a thickness is defined as duplicating and offsetting the surface in two directions perpendicular to the surface which maintains the characteristics of TPMS on both surfaces. In this strategy, a sheet-networks feed spacer is created. Using the second strategy, the solid-networks feed spacer is created by solidifying one of the volumes partitioned by the TPMS topology. At this stage, a unit cell of TPMS is obtained where the assigned thickness controls the solid volume fraction in sheet-networks feed spacers (or equivalently the relative density) of the TPMS shape within the unit cell. The relative density of solid-networks feed spacer is controlled by mathematical parameters that are used to create the TPMS surface. Note that the relative density of TPMS can be defined as the solid volume of the TPMS divided by the volume of the smallest cube (or unit cell) that can enclose the TPMS or equivalently as the ratio of the mass density of the TPMS unit cell to the mass density making the solid part of the unit cell. The CAD software also allows for calculating the surface area of the TPMS. The geometric (specific) surface area is defined as the surface area of the TPMS of the smallest cube (or unit cell) that can enclose the TPMS divided by the corresponding volume. Changing the thickness and/or the size of the unit cell may further change the geometric surface area of the TPMS.

Figure 2:
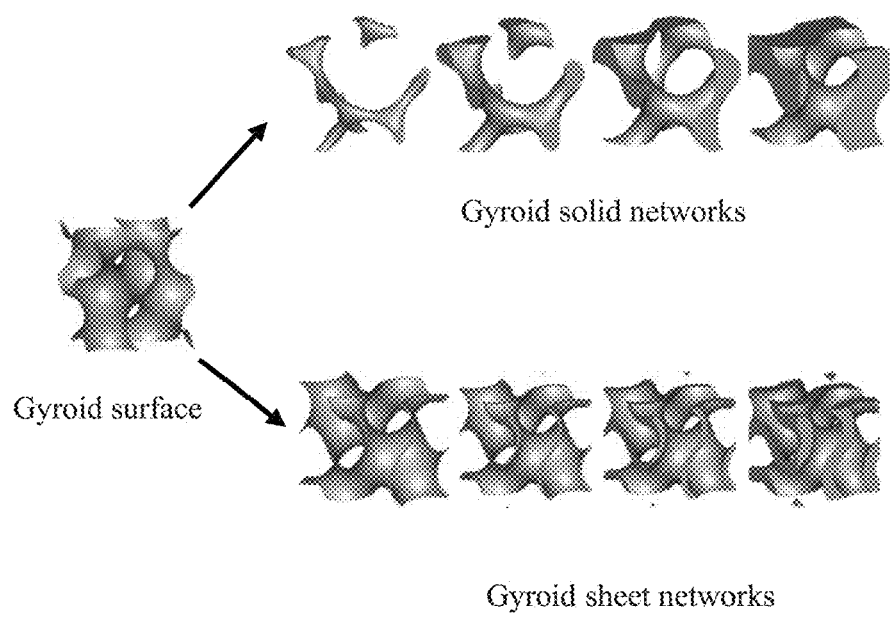
FIG. 2 is an image of solid-networks and sheet-networks from TPMS unit cell according to some embodiments.
Figure 3:
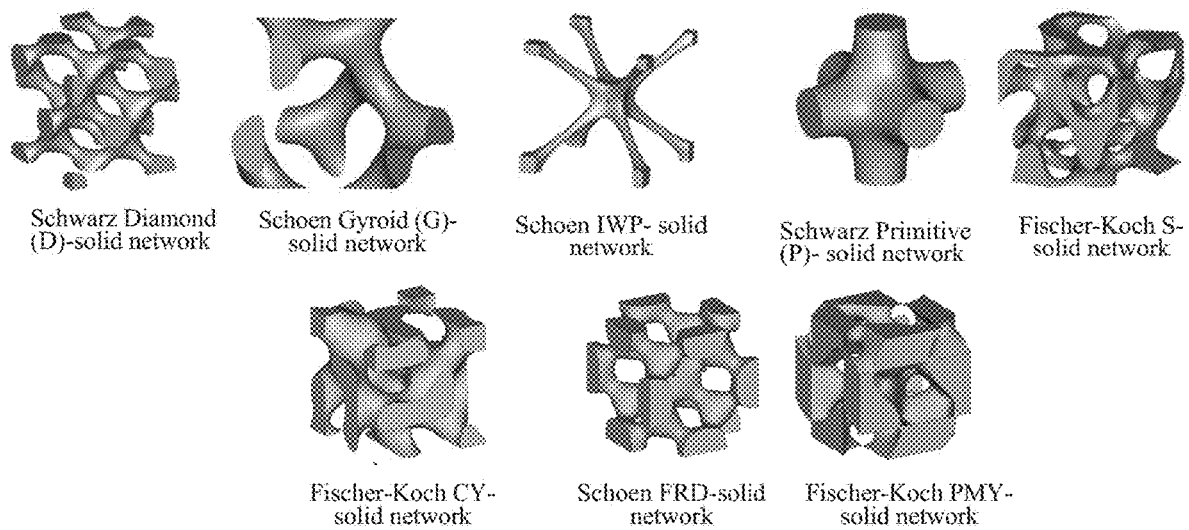
FIG. 3 illustrates different types of solid-networks based on various TPMS geometries according to some embodiments.
Figure 4:
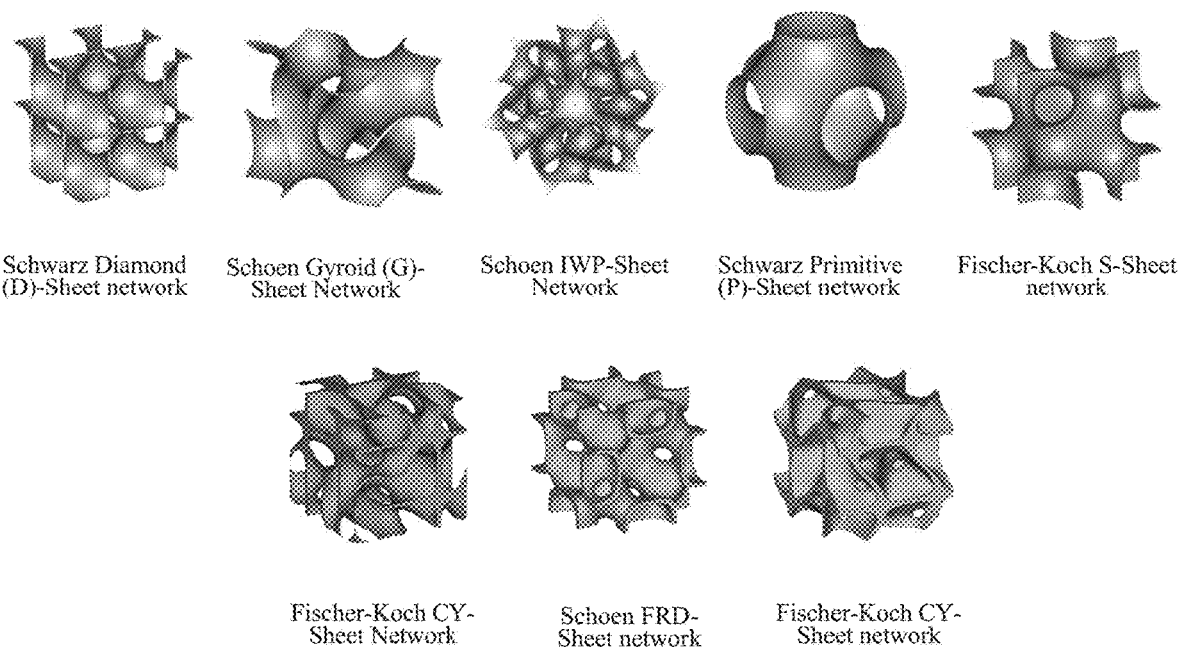
FIG. 4 illustrates different types of sheet-networks based on various TPMS geometries according to some embodiments.

Further, a solid design for the TPMS feed spacer may be created from these unit cells using two primary strategies. As shown in FIG. 2, a surface represented by Gyroid geometry is made into two distinct solid designs by giving the minimal surface a certain thickness, which is continuous and fixed throughout the structure such that the volume fraction is controlled by the given thickness. In the first design, termed sheet-networks, a shell-like structure is created and the characteristics of TPMS are maintained on both sides of the thickened structure. Another design, termed solid-networks, is developed by solidifying one of the volumes partitioned by the TPMS topology, where the TPMS characteristics are maintained on the interface between the solid/void interfaces. Using these two methods, other geometric TPMS morphologies can be created of solid-networks as shown in FIG. 3 and of the paired sheet-networks as shown in FIG. 4.

Figure 5A:
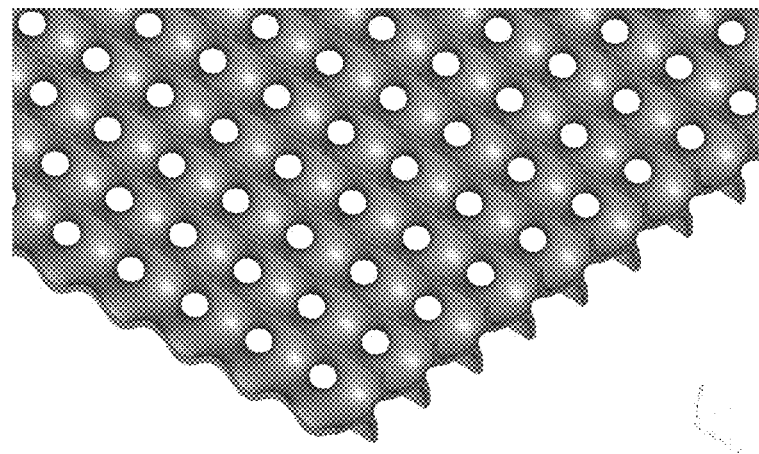
FIG. 5A is an image of a feed spacer comprising a sheet of Schwarz crossed layers of parallels (CLP) according to some embodiments.
Figure 5B:
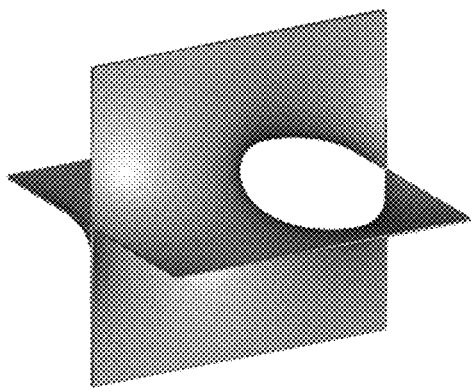
FIG. 5B is a unit cell thereof.
Figure 6A:
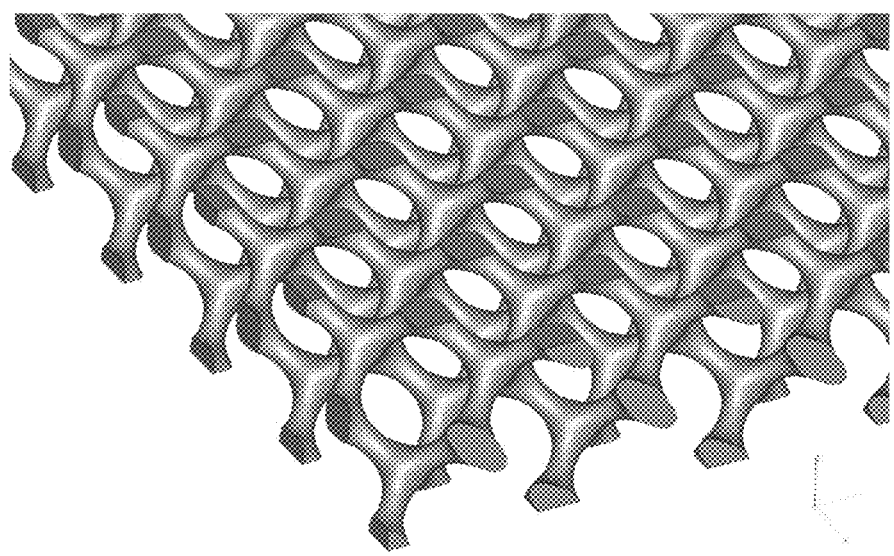
FIG. 6A is an image of a feed spacer comprising a sheet of Schwarz diamond D-solid-networks according to some embodiments.
Figure 6B:
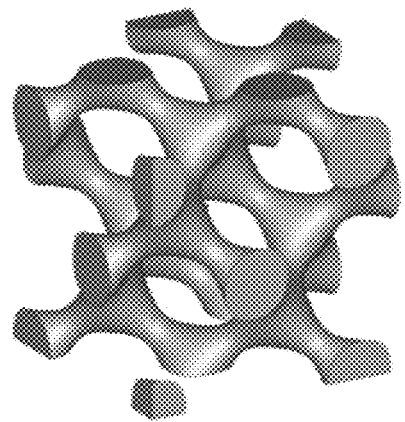
FIG. 6B is a unit cell thereof.
Figure 7A:
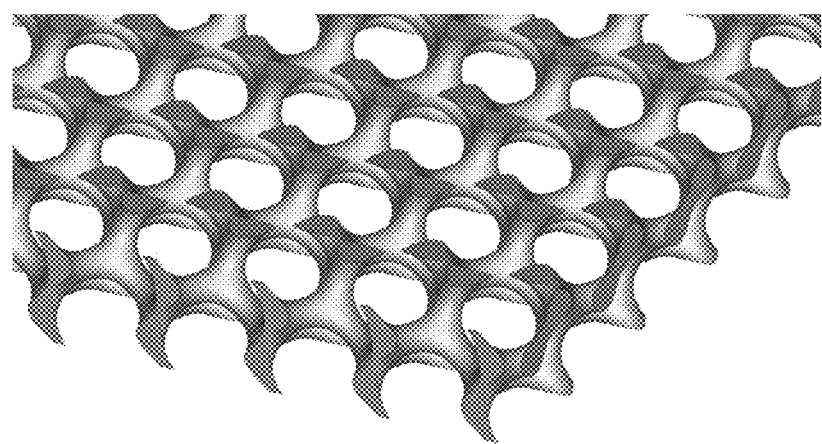
FIG. 7A is an image of a feed spacer comprising a sheet of Schoen's Gyroid G-solid-networks according to some embodiments.
Figure 7B:
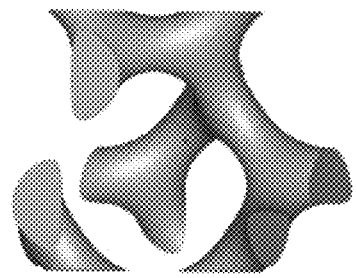
FIG. 7B is a unit cell thereof.
Figure 8A:
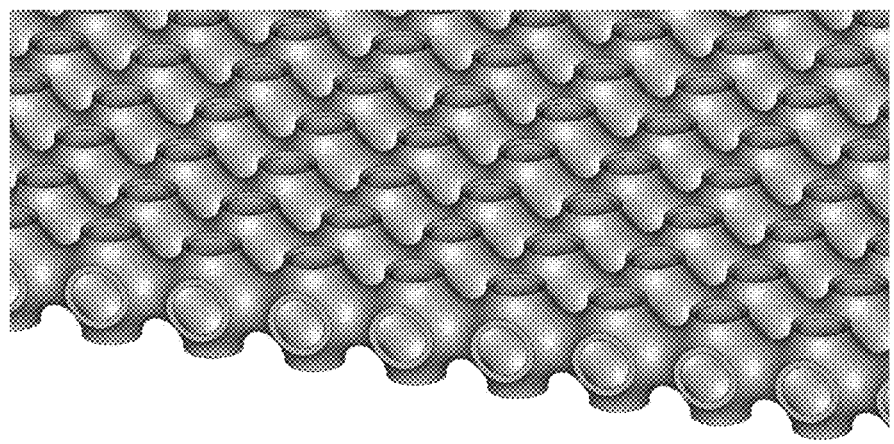
FIG. 8A is an image of a feed spacer comprising a sheet of Schwarz Primitive P-sheet-networks according to some embodiments.
Figure 8B:
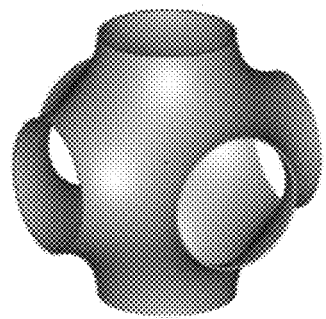
FIG. 8B is a unit cell thereof.
Figure 9A:
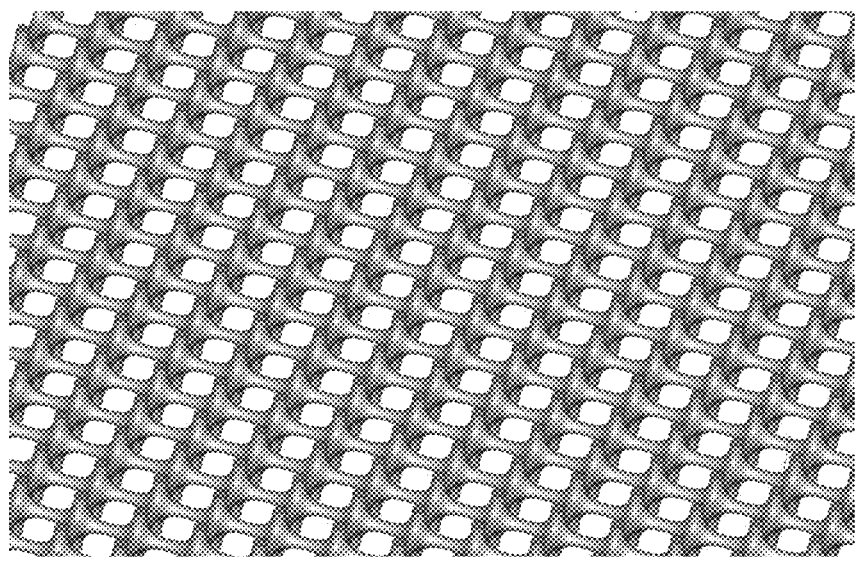
FIG. 9A is an image of a feed spacer comprising a sheet of Schwarz Primitive P-solid-networks according to some embodiments.
Figure 9B:
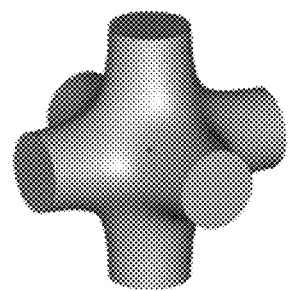
FIG. 9B is a unit cell thereof.

In the third step (Block 204), the unit cell created can be patterned in three-dimensions within any desired structure or geometry. Note that steps at Blocks 202 and 204 can be interchanged such that the TPMS surface is patterned within the desired structure or geometry and then thickened to achieve the needed relative density or volume fraction. Examples of periodic minimal surfaces are shown in FIGS. 5A-5B as a sheet of Schwarz crossed layers of parallels (CLP), in FIGS. 6A-6B as a sheet of Schwarz diamond D-solid-networks, in FIGS. 7A-7B as a sheet of Schoen's Gyroid G-solid-networks, in FIGS. 8A-8B as a sheet of Schwarz Primitive P-sheet-networks, and lastly, FIGS. 9A-9B as a sheet of Schwarz Primitive P-solid-networks.

Figure 15:
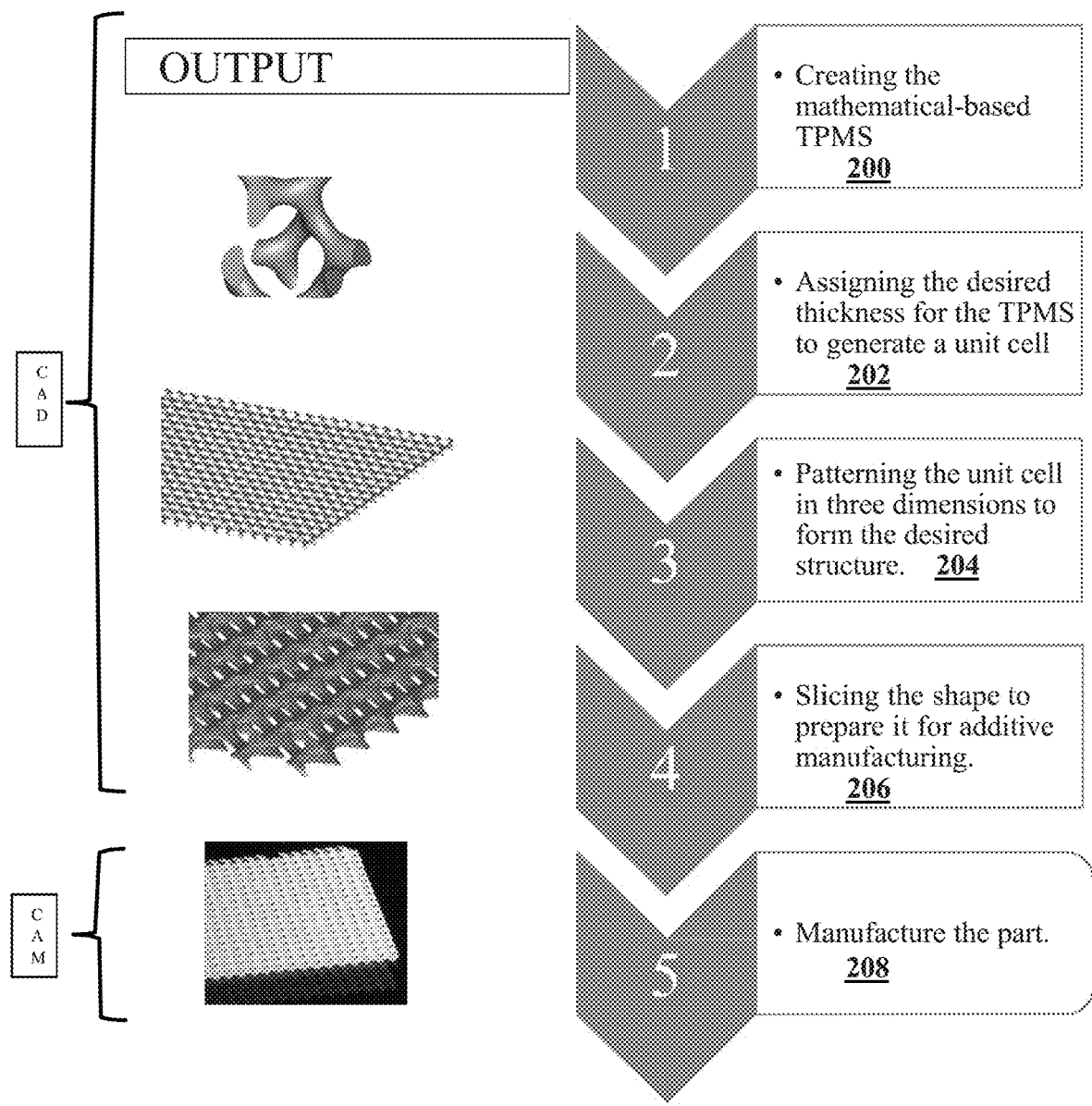
FIG. 15 represents the steps of designing and manufacturing a feed spacer based on TPMS according to some embodiments.

In the fourth step (Block 206) with continued reference to FIG. 15, in order to produce a physical rendition of the TPMS-based structure, a stereo-lithography (STL) computer file is generated for the three-dimensional (3D) component which is then sliced into two-dimensional patterns and repeated to form a 3D structure. In a fifth step (Block 208), computer aided manufacturing is employed to transform the computer aided designed file into a real product made of any desirable material.

Example 2: Testing of TPMS Feed Spacers for Flux Properties

Figure 10A:
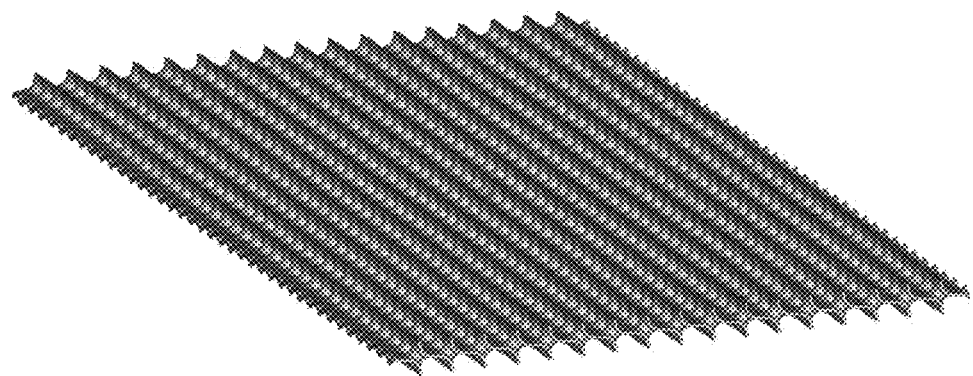
FIG. 10A is a CAD image of a feed spacer based on Schwarz crossed layers of parallels (CLP) according to some embodiments.
Figure 10B:
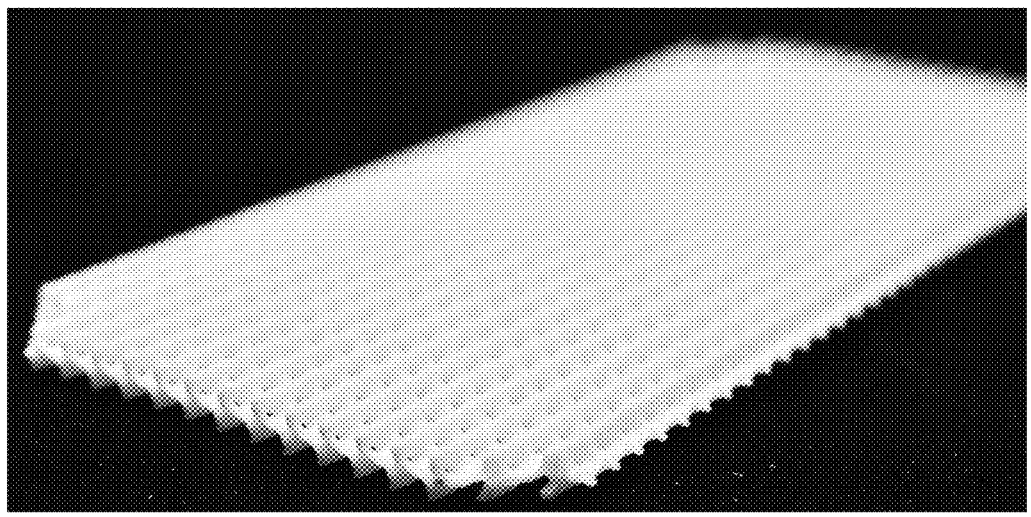
FIG. 10B is a 3D printed feed spacer corresponding to the CAD image of FIG. 10A.
Figure 11A:
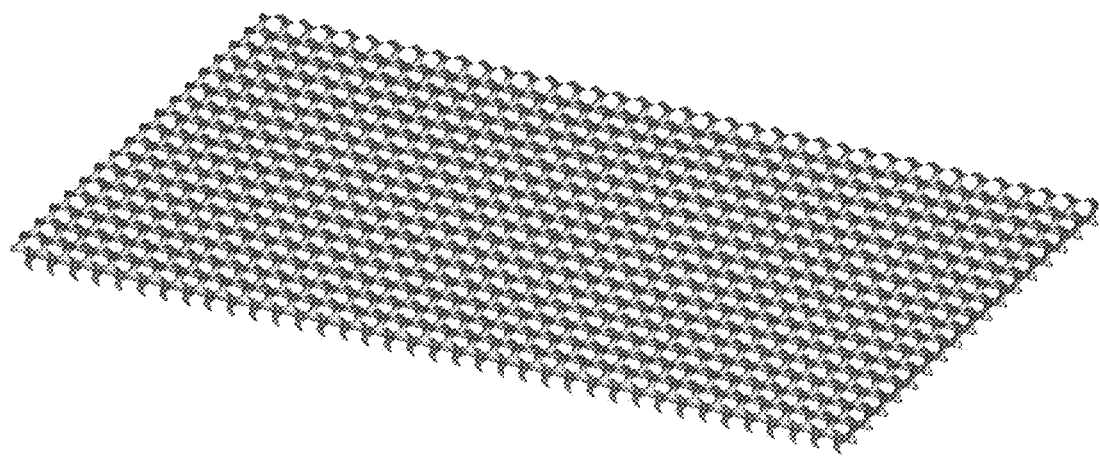
FIG. 11A is a CAD image of a feed spacer based on a Schoen Gyroid G-solid networks according to some embodiments.
Figure 11B:
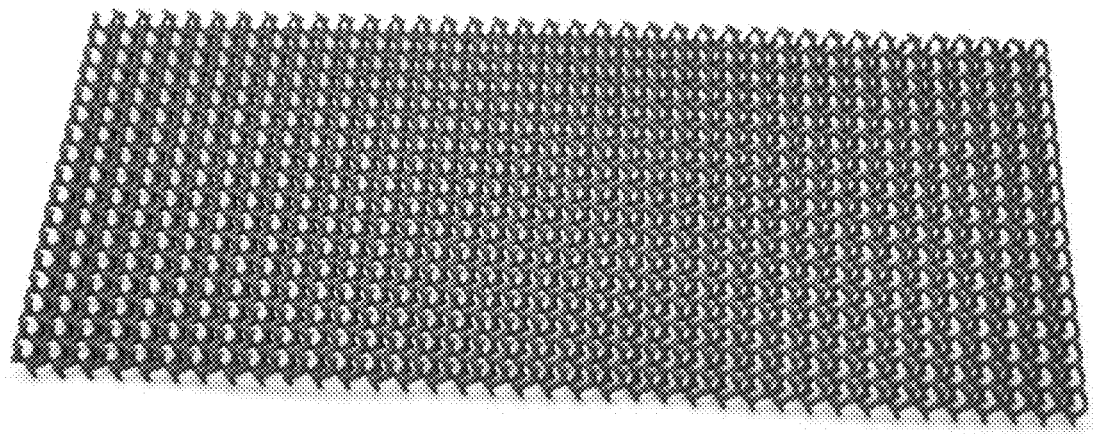
FIG. 11B is a 3D printed feed spacer corresponding to the CAD image of FIG. 11A.
Figure 12A:
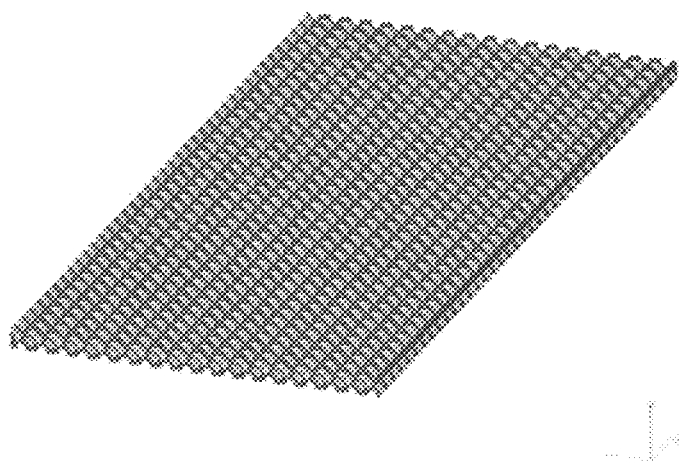
FIG. 12A is a CAD image of a feed spacer based on a Schwarz Primitive P-sheet.
Figure 12B:
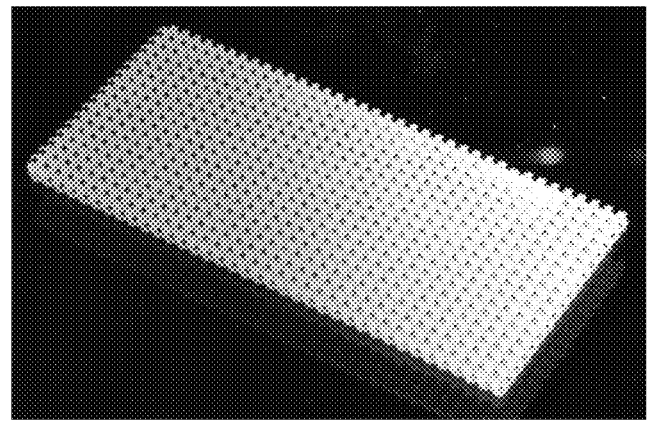
FIG. 12B is a 3D printed feed spacer corresponding to the CAD image of FIG. 12A.
Figure 13A:
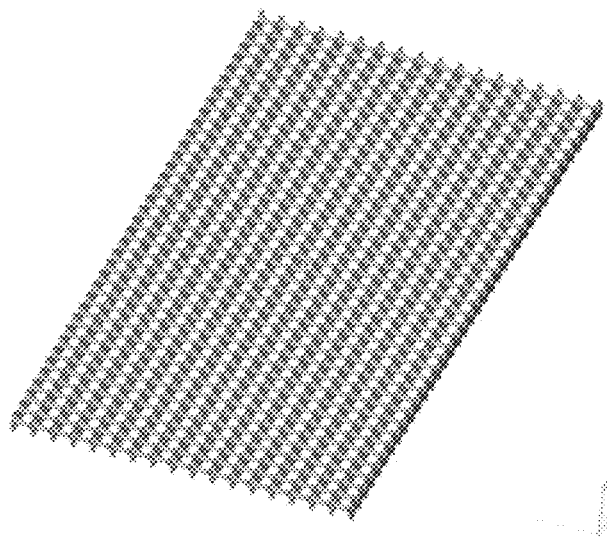
FIG. 13A is a CAD image of a feed spacer based on a Schwarz Primitive P-solid network.
Figure 13B:
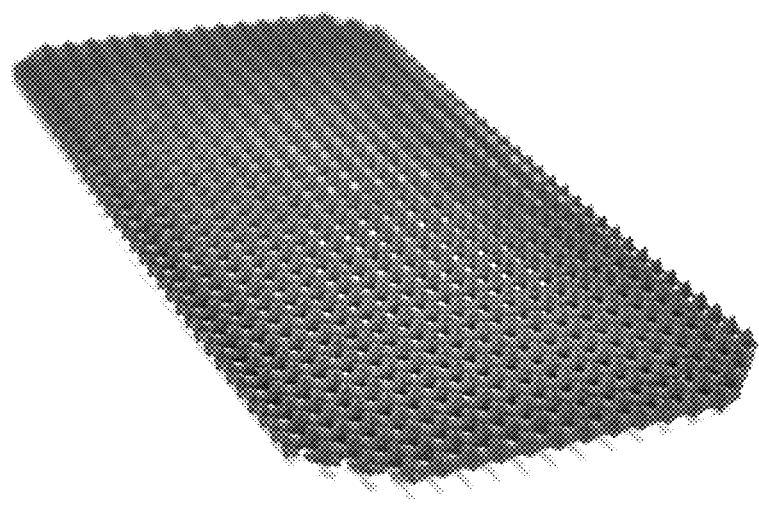
FIG. 13B is a 3D printed feed spacer corresponding to the CAD image of FIG. 13A.
Figure 14:
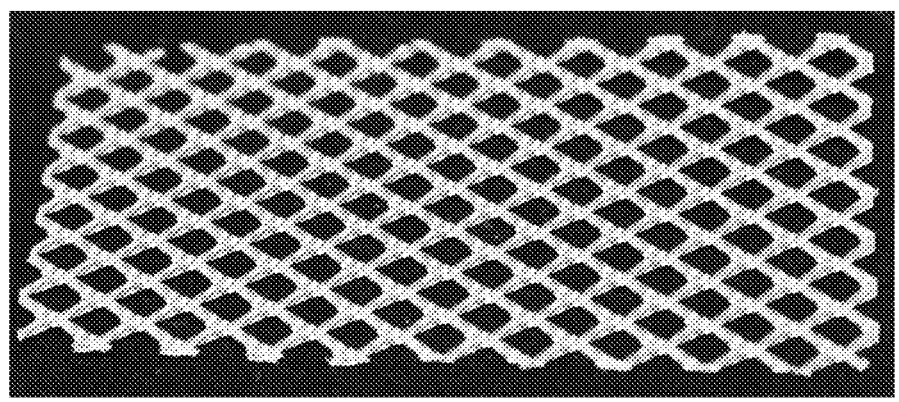
FIG. 14 shows a commercial diamond-type net spacer manufactured by extrusion process.

After the CAD structure surface is designed, the drawing can be made into a feeder spacer using 3-D printer technologies to generate a physical model of the structure to be tested for flux properties. Example of CAD drawing of TMPS surfaces are shown in FIGS. 10-13 on the upper panel with the actual 3-D printed feed surface shown below. FIGS. 10A-10B illustrate a feed spacer based on Schwarz crossed layers of parallels (CLP), 3D printed spacer below. FIGS. 11A-11B illustrate a feed spacer based on a Schoen Gyroid G-solid-networks. FIGS. 12A-12B illustrate a feed spacer based on a Schwarz Primitive P-sheet-networks. FIGS. 13A-13B illustrate a feed spacer based on a Schwarz Primitive P-solid-networks.

Figure 16:
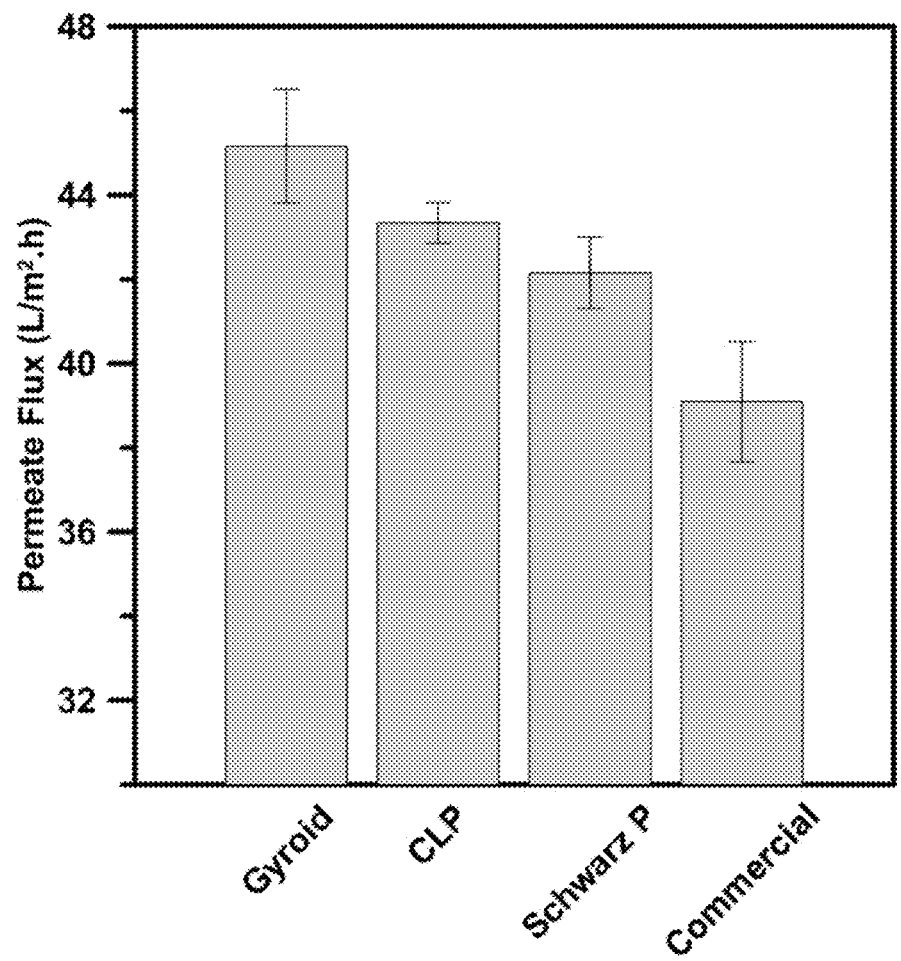
FIG. 16 is a graph of the permeate flux for reverse osmosis tests of a commercial spacer, a "primitive-type P-solid-networks" TPMS spacer, a "CLP-type" TPMS spacer, and a "Schoen Gyroid G-solid-networks" TPMS spacer according to some embodiments.

In FIGS. 10A-10B a TPMS spacer using the geometry of CLP solid networks was made using 3D printing technology, in FIGS. 11A-11B a TPMS spacer using the geometry of Schoen Gyroid G-solid-networks was made using 3D printing technology, in FIGS. 13A-13B, a TPMS Spacer using the geometry of Schwarz Primitive Surface was made using 3D printing technology and these were tested in a reverse osmosis (RO) setup, using synthetic seawater as feed. The results were compared with those of a standard, commercial diamond-type net spacer as shown in FIG. 16. The TPMS Spacers perform well, with the Schoen Gyroid TPMS spacer showing best results with a flux 15.5% higher than a commercial spacer. This indicates a significant improvement in the overall performance of a RO system.

Figure 17:
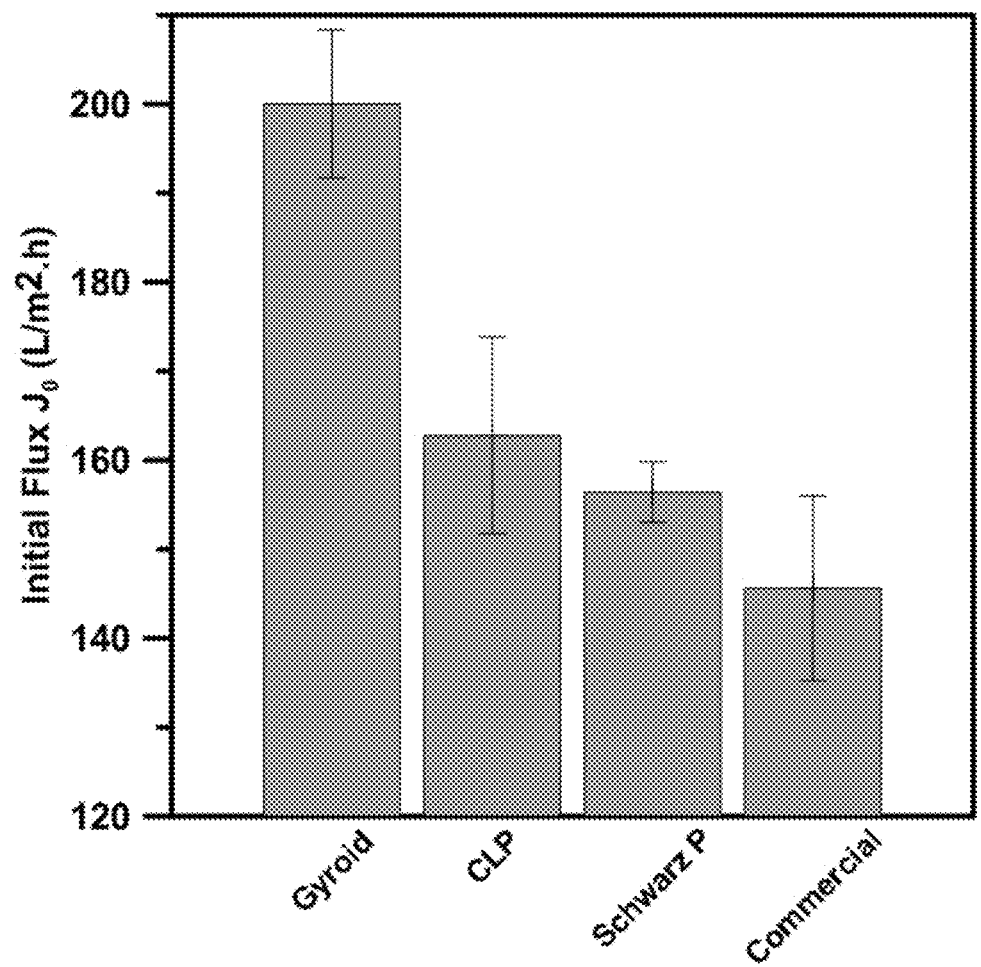
FIG. 17 is a graph of the initial permeate flux for ultrafiltration tests of a commercial spacer, a "primitive-type P-solid-networks" TPMS spacer, a "CLP-type" TPMS spacer, and a "Schoen Gyroid G-solid-networks" TPMS spacer according to some embodiments.
Figure 18A:
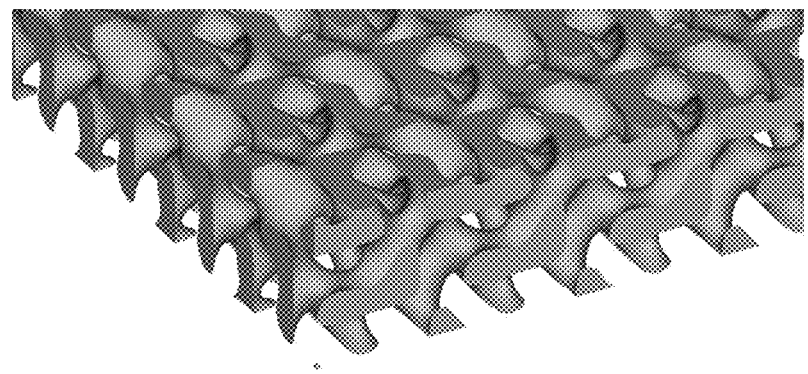
FIGS. 18A-18B, 19A-19B, 20A-20B, 21A-21B, and 22A-22B are images of a feed spacer comprising a sheet of TPMS architectures (A) according to some embodiments, and corresponding unit cells thereof (B).
Figure 18B:
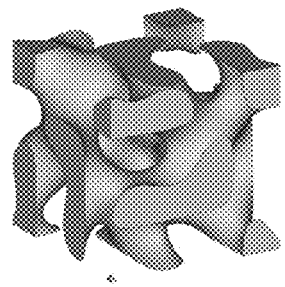
Figure 19A:
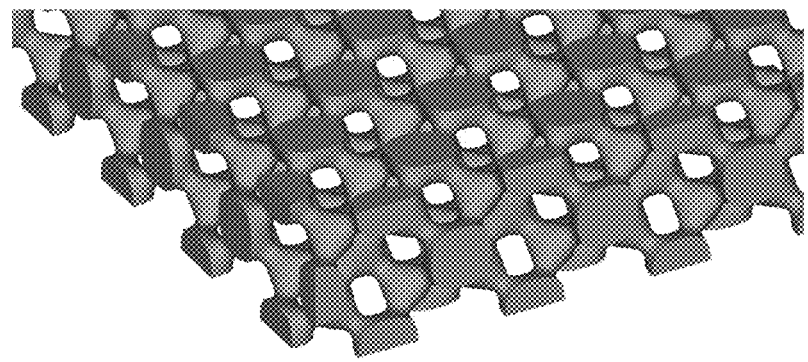
Figure 19B:
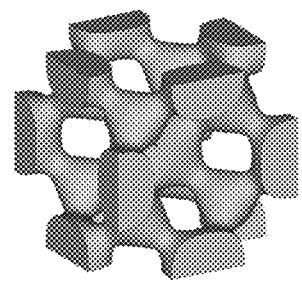
Figure 20A:
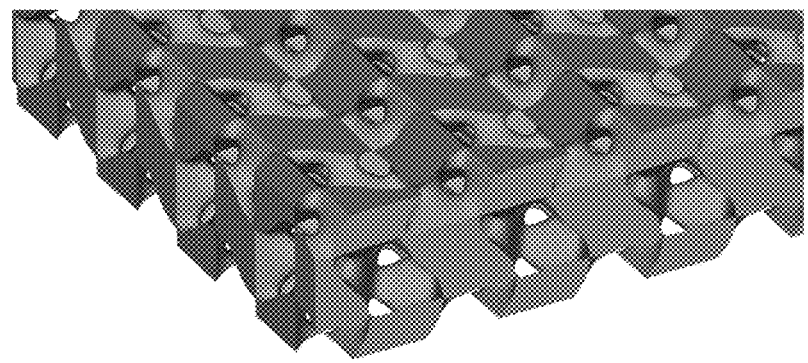
Figure 20B:
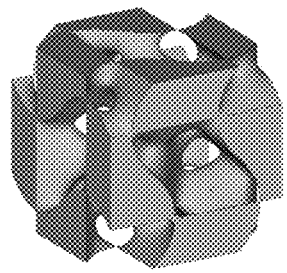
Figure 21A:
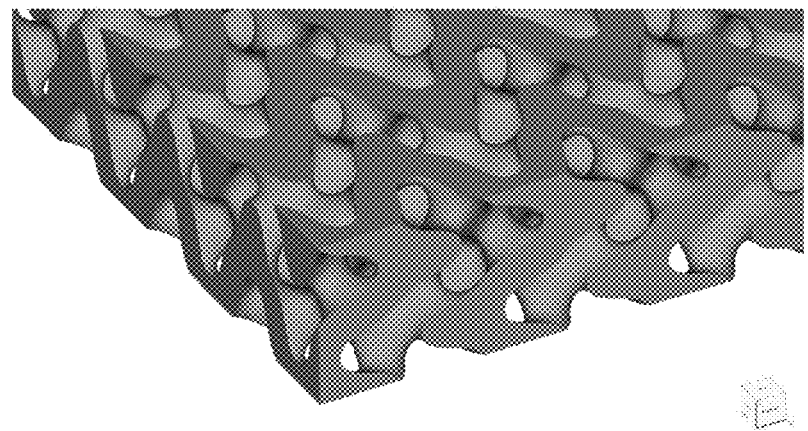
Figure 21B:
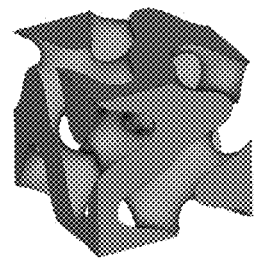
Figure 22A:
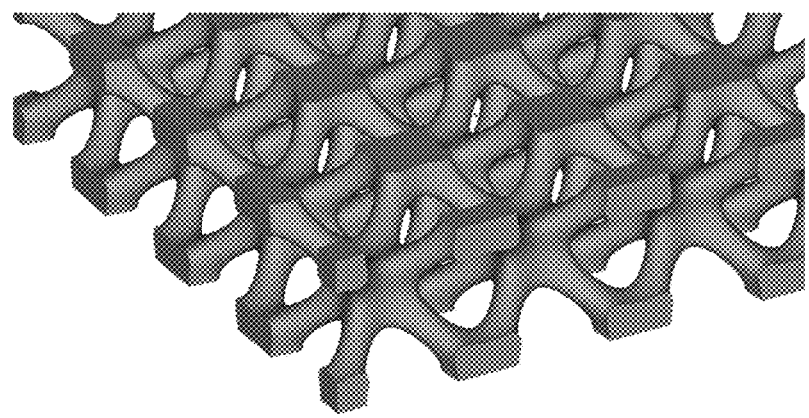
Figure 22B:
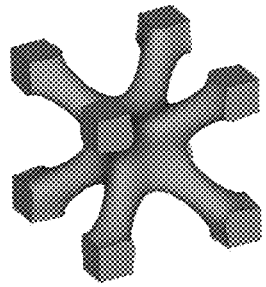

In FIGS. 10A-10B a TPMS spacer using the geometry of CLP solid networks was made using 3D printing technology, in FIGS. 11A-11B a TPMS spacer using the geometry of Schoen Gyroid G-solid-networks was made using 3D printing technology, in FIGS. 13A-13B, a TPMS Spacer using the geometry of Schwarz Primitive Surface was made using 3D printing technology and these were tested in a ultrafiltration (UF) setup, using sodium alginate solution as feed. In FIG. 17, the results were compared with those of a standard, commercial diamond-type net spacer. The TPMS spacers all showed better initial flux than the commercial spacer, with the Schoen Gyroid TPMS spacer showing a 38% improvement in initial flux compared to the commercial spacer, which represents a significant potential for performance enhancement.

The foregoing is illustrative of the present invention and is not to be construed as limiting thereof. Although a few example embodiments of this invention have been described, those skilled in the art will readily appreciate that many modifications are possible in the example embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A filtration device comprising:
    a filter element configured to allow a fluid to pass through, the filter element comprising at least:
        two membrane layers; and
        a 3D-printed spacer that is 0.5 mm or less thick and is positioned sandwiched between at least the two membrane layers, the 3D-printed spacer having a structure comprising a plurality of layers, each of the layers having a two-dimensional pattern, wherein the plurality of layers are stacked on one another to form a plurality of unit cells arranged in three dimension, each of the plurality of unit cells comprising a cavity that is 0.5 mm or less in diameter and is defined by a triply periodic minimal surface, wherein the cavities of the plurality of unit cells are interconnected to allow the fluid to pass through the cavities and to allow the 3D-printed spacer to act as an efficient feed or permeate spacer.

2. The filtration device of claim 1, wherein the cavities of the plurality of unit cells have a geometry that (a) increases a turbulence of fluid flowing through the filter element and (b) increases a mixing of the fluid along at least one surface of the two membrane layers.

3. The filtration device of claim 1, wherein at least one of the plurality of layers has a two-dimensional dimensional pattern that is the same as the two-dimensional pattern of another of the plurality of layers.

4. The filtration device of claim 3, wherein the plurality of layers have the same two-dimensional pattern.

5. The filtration device of claim 1, wherein one of the two membrane layers is an intervening membrane layer and the 3D-printed spacer is arranged as a 3D-printed feed spacer along one side of the intervening membrane layer, wherein the filter element further comprises a 3D-printed permeate-side spacer defining a permeate channel on an opposite side of the intervening membrane layer from the 3D-printed feed spacer.

6. The filtration device of claim 5, wherein the fluid is a feed fluid having a solute and wherein the 3D-printed feed spacer defines at least a portion of a feed stream channel configured to receive the feed fluid with the solute and the intervening membrane layer is configured to filter the feed fluid to form a permeate having a reduced concentration of the solute in the permeate channel.

7. The filtration device of claim 6, wherein the feed stream channel outputs a reject stream having a higher concentration of solute than a feed stream.

8. The filtration device of claim 1, wherein the filtration device is a reverse osmosis device, a microfiltration device, an ultrafiltration device, a spiral wound filtration device, a flat sheet/plate device, a thermal gradient device, or a membrane distillation device.

9. The filtration device of claim 1, wherein the triply periodic minimal surface is a Schwarz Primitive surface, a Schwarz crossed layers of parallels (CLP), a Schoen's Gyroid surface, a Schoen's I-WP surface, a Schwarz diamond surface, a Fischer-Koch PMY surface, a FRD surface, a Fischer-Koch CY surface, a Fischer-Koch S surface, or a Neovius surface.

10. The filtration device of claim 1, wherein the 3D-printed spacer comprises a polymeric material, a ceramics material, a metal material or composites thereof.

11. The filtration device of claim 1, wherein the cavities of the 3D-printed spacer are configured to allow the fluid to flow between the two membrane layers.

12. The filtration device of claim 1, wherein the 3D-printed spacer is 0.1 mm or less thick; and wherein each cavity of the plurality of unit cells is 0.1 mm or less in diameter.

13. A filtration device comprising:
    a housing;
    a filter element in the housing, the filter element comprising at least:
        three membrane layers including an intervening membrane layer positioned between a first outward membrane layer and a second outward membrane layer; and
        a feed stream channel defined by a 3D-printed feed spacer that is 0.5 mm or less thick and is positioned sandwiched between at least the first outward membrane layer and the intervening membrane layer, the feed stream channel being configured to receive a feed fluid comprising a solute, wherein the 3D-printed feed spacer comprises a structure having a plurality of unit cells arranged in three dimensions, each of the plurality of unit cells comprising a cavity defined by a triply periodic minimal surface, wherein the cavities of the plurality of unit cells are interconnected to allow the feed fluid to pass through the cavities; and a 3D-printed permeate-side spacer that is 0.5 mm or less thick and is positioned sandwiched between at least the second outward membrane layer and the intervening membrane layer, the 3D-printed permeate-side spacer defining a permeate channel on a side of the intervening membrane layer opposite the 3D-printed feed spacer and configured to receive a permeate fluid via the intervening membrane layer, the permeate fluid having a concentration of the solute that is less than a concentration of the solute in the feed fluid, wherein the 3D-printed permeate-side spacer comprises a structure having a plurality of unit cells arranged in three dimensions, each of the plurality of unit cells comprising a cavity that is 0.5 mm or less in diameter and is defined by a triply periodic minimal surface, wherein the cavities of the plurality of unit cells are interconnected to allow the permeate fluid to pass through the cavities;

a feed channel inlet configured to provide a feed fluid input to the feed stream channel; and a permeate outlet configured to provide a permeate output from the permeate-side spacer.

14. The filtration device of claim 13, wherein the cavities of the plurality of unit cells of the 3D-printed feed spacer and/or the 3D-printed permeate-side spacer have a geometry that (a) increases a turbulence of fluid flowing through the filter element and (b) increases a mixing of the fluid along at least one surface of the three membrane layers.

15. The filtration device of claim 13, wherein the filter element comprises a plurality of filter elements spirally wound around a hollow tubular member, the hollow tubular member having at least one open end and apertures along a length thereof configured to receive the permeate fluid from the 3D-printed permeate-side spacer, and wherein the permeate outlet comprises the at least one open end of the tubular member.

16. The filtration device of claim 13, wherein the feed stream channel is configured to output a reject stream having a higher concentration of the solute than the feed fluid.

17. The filtration device of claim 13, wherein the housing is configured to contain fluid in the filter element under a pressure greater than atmospheric pressure.

18. The filtration device of claim 13, wherein at least one of the 3D-printed feed spacer or the 3D-printed permeate-side spacer comprises a generally planar body having opposing surfaces.

19. The filtration device of claim 13, wherein the triply periodic minimal surface of the 3D-printed feed spacer and/or the 3D-printed permeate-side spacer is a Schwarz Primitive surface, a Schwarz crossed layers of parallels (CLP), a Schoen's Gyroid surface, a Schoen's I-WP surface, a Schwarz diamond surface, a Fischer-Koch PMY surface, a FRD surface, a Fischer-Koch CY surface, a Fischer-Koch S surface, or a Neovius surface.

20. The filtration device of claim 13, wherein at least one of the 3D-printed feed spacer or the 3D-printed permeate-side spacer comprises a polymeric material, a ceramics material, a metal material or composites thereof.

* * * * *